United States Patent
Martin et al.

(10) Patent No.: US 9,656,671 B2
(45) Date of Patent: May 23, 2017

(54) COAST SWITCH FOR AN ELECTRIFIED VEHICLE

(71) Applicant: FORD GLOBAL TECHNOLOGIES, LLC, Dearborn, MI (US)

(72) Inventors: Douglas Raymond Martin, Canton, MI (US); Kenneth James Miller, Canton, MI (US); William Perkins, Dearborn, MI (US); Derek Hartl, Royal Oak, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 331 days.

(21) Appl. No.: 14/468,143

(22) Filed: Aug. 25, 2014

(65) Prior Publication Data

US 2016/0052519 A1    Feb. 25, 2016

(51) Int. Cl.
*B60W 30/18*    (2012.01)
*B60W 10/02*    (2006.01)
*B60W 20/40*    (2016.01)
*B60W 10/08*    (2006.01)
*F16H 59/02*    (2006.01)
*F16H 59/10*    (2006.01)

(52) U.S. Cl.
CPC ...... *B60W 30/18072* (2013.01); *B60W 10/02* (2013.01); *B60W 10/08* (2013.01); *B60W 20/40* (2013.01); *B60W 30/18127* (2013.01); *F16H 59/02* (2013.01); *B60L 2260/24* (2013.01); *B60W 2030/1809* (2013.01); *F16H 59/105* (2013.01); *F16H 2059/0221* (2013.01)

(58) Field of Classification Search
CPC ...... B60W 10/02; B60W 10/08; B60W 20/40; B60W 2030/1809; B60W 30/18127; B60L 2260/24

USPC .......... 180/65.1, 65.21, 65.31; 903/912, 914, 903/946, 947

See application file for complete search history.

(56) References Cited

U.S. PATENT DOCUMENTS

| | | | |
|---|---|---|---|
| 2,412,228 A | 12/1946 | Oetzel | |
| 4,716,980 A * | 1/1988 | Butler | B62D 51/002 180/19.2 |
| 5,450,324 A * | 9/1995 | Cikanek | B60L 3/102 303/20 |
| 5,964,313 A | 10/1999 | Guy | |
| 6,364,434 B1 * | 4/2002 | Sway-Tin | B60L 15/20 303/152 |
| 6,378,636 B1 * | 4/2002 | Worrel | B60L 15/20 180/65.25 |
| 6,464,025 B1 * | 10/2002 | Koeper | B62B 5/06 180/19.2 |
| 6,470,256 B1 | 10/2002 | Cikalo et al. | |
| 8,433,494 B2 | 4/2013 | Vogel | |
| 9,026,296 B1 * | 5/2015 | Johri | B60W 20/10 701/22 |
| 9,238,412 B2 * | 1/2016 | Kidston | B60L 7/26 |

(Continued)

OTHER PUBLICATIONS

Cocron et al, "Energy Recapture through deceleration—regenerative braking in electric vehicles from a user perspective—Abstract", Jun. 14, 2013.*

*Primary Examiner* — Erick Solis
(74) *Attorney, Agent, or Firm* — Carlson, Gaskey & Olds, P.C.

(57) ABSTRACT

An example method of controlling an electrified vehicle includes activating a coast switch to a place an electrified vehicle in a coast mode.

15 Claims, 3 Drawing Sheets

(56) References Cited

U.S. PATENT DOCUMENTS

| | | | |
|---|---|---|---|
| 9,440,653 B2 * | 9/2016 | Suzuki | B60W 30/18072 |
| 2004/0099453 A1 * | 5/2004 | Guy | B62D 51/04 |
| | | | 180/65.1 |
| 2005/0236197 A1 * | 10/2005 | Gallagher | B62B 3/0612 |
| | | | 180/65.1 |
| 2008/0029319 A1 * | 2/2008 | Fleckner | B60K 6/48 |
| | | | 180/65.265 |
| 2008/0202833 A1 | 8/2008 | Dickie | |
| 2010/0198436 A1 * | 8/2010 | Falkenstein | B60K 6/387 |
| | | | 701/22 |
| 2012/0325042 A1 * | 12/2012 | Takiguchi | B60W 10/06 |
| | | | 74/513 |
| 2014/0094344 A1 | 4/2014 | Pedlar et al. | |

\* cited by examiner

COAST SWITCH FOR AN ELECTRIFIED VEHICLE

TECHNICAL FIELD

This disclosure is directed toward coasting an electrified vehicle to, among other things, increase fuel economy.

BACKGROUND

Generally, electrified vehicles differ from conventional motor vehicles because electrified vehicles are selectively driven using one or more battery-powered electric machines. Conventional motor vehicles, by contrast, rely exclusively on an internal combustion engine to drive the vehicle. Electrified vehicles may use electric machines instead of, or in addition to, the internal combustion engine.

Example electrified vehicles include hybrid electrified vehicles (HEVs), plug-in hybrid electrified vehicles (PHEVs), fuel cell vehicles, and battery electrified vehicles (BEVs). A powertrain of an electrified vehicle is typically equipped with a battery pack having battery cells that store electrical power for powering the electric machine. The battery cells may be charged prior to use. The battery cells may be recharged during a drive via regenerative braking or the internal combustion engine.

Regenerative braking and friction braking can decrease fuel economy in electrified vehicles.

SUMMARY

A method of controlling an electrified vehicle according to an exemplary aspect of the present disclosure includes, among other things, activating a coast switch to a place an electrified vehicle in a coast mode.

In a further non-limiting embodiment of the foregoing method, the method includes maintaining a gear selector in a drive mode during the activating.

In a further non-limiting embodiment of any of the foregoing methods, the gear selector can be actuated between at least a drive mode, a neutral mode, and a reverse mode.

In a further non-limiting embodiment of any of the foregoing methods, the coast switch is separate from a gear selector of the electrified vehicle.

In a further non-limiting embodiment of any of the foregoing methods, activating the coast switch comprises moving the coast switch from a first position to a second position.

In a further non-limiting embodiment of any of the foregoing methods, the second position is a depressed position and the first position is a released position.

In a further non-limiting embodiment of any of the foregoing methods, the coast switch is biased to the first position, and a user holds the coast switch in the second position to overcome the bias and maintain the electrified vehicle in the coast mode.

In a further non-limiting embodiment of any of the foregoing methods, deactivating the coast switch comprises moving the coast switch from the second position to the first position.

In a further non-limiting embodiment of any of the foregoing methods, the method includes activating the coast switch separately from a gear selector of the electrified vehicle without applying a brake.

In a further non-limiting embodiment of any of the foregoing methods, the method includes disengaging gears of a powersplit powertrain in response to activating the coast mode.

An electrified vehicle according to an exemplary aspect of the present disclosure includes, among other things, a gear selector and a coast switch separate from the gear selector. The coast switch is activated to selectively place an electrified vehicle in a coast mode.

In a further non-limiting embodiment of the foregoing electrified vehicle, the gear selector can be actuated between at least a drive mode, a neutral mode, and a reverse mode.

In a further non-limiting embodiment of any of the foregoing electrified vehicles, the coast switch is activated to selectively place the electrified vehicle in the coast mode when the gear selector is in drive mode.

In a further non-limiting embodiment of any of the foregoing electrified vehicles, the coast switch comprises a button disposed on a gear shift knob.

In a further non-limiting embodiment of any of the foregoing electrified vehicles, the coast switch comprises a button disposed on a steering wheel of the electrified vehicle.

In a further non-limiting embodiment of any of the foregoing electrified vehicles, the coast switch is activated by moving the coast switch from a first position to a second position.

In a further non-limiting embodiment of any of the foregoing electrified vehicles, the second position is a depressed position and the first position is a released position.

In a further non-limiting embodiment of any of the foregoing electrified vehicles, the coast switch is biased to the first position, and a user holds the coast switch in the second position to overcome the bias and maintain the electrified vehicle in the coast mode.

In a further non-limiting embodiment of any of the foregoing electrified vehicles, deactivating the coast switch comprises moving the coast switch from the second position to the first position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure is directed toward maximizing fuel economy in an electrified vehicle. Some electrified vehicles use aggressive regenerative braking. Regenerative braking slows the electrified vehicle at a faster rate than permitting the electrified vehicle to coast to a stop. However, coasting, rather than applying regenerative brakes, can avoid losses associated with moving energy to and from a battery of the electrified vehicle. This disclosure provides a system for moving the electrified vehicle into a coast mode.

Figure 1:
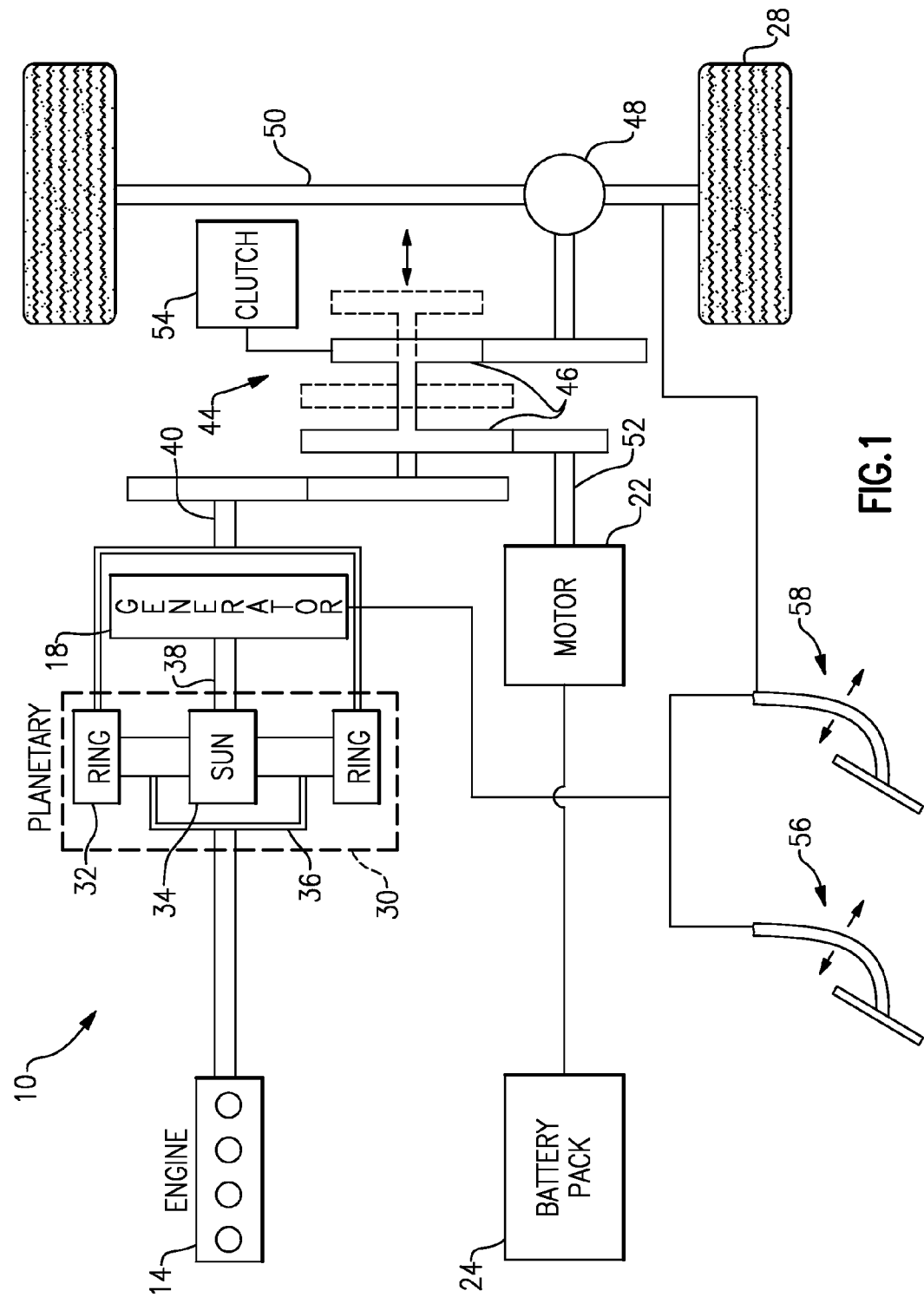
FIG. 1 schematically illustrates an example electrified vehicle powertrain.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles, and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle battery assembly. The battery pack 24 may have the form of a high voltage battery that is capable of outputting electrical power to operate the motor 22 and the generator 18. Other types of energy storage devices and/or output devices can also be used with the electrified vehicle having the powertrain 10.

The example powertrain 10 includes a clutch 54 that can be actuated to move the gears 46, or other portions of the power transfer unit 44, between an engaged position and a disengaged position. In the engaged position, the first drive system, the second drive system, or both, can transmit torque to the differential 48. In the disengaged position (shown in broken lines), the first and second drive systems cannot transmit torque to the differential 48. The powertrain 10 is in a coast mode when the clutch 54 positions the power transfer unit 44 in the disengaged position.

The example powertrain 10 responds to inputs from an accelerator pedal 56 and a brake pedal 58. When the powertrain 10 is not in a coast mode, pressing the accelerator pedal 56 causes the powertrain 10 to accelerate the vehicle drive wheels 28. Lifting off the accelerator pedal 56 slows the vehicle drive wheels 28. Lifting off of the accelerator pedal 56 may, in some electrified vehicles, initiate regenerative braking. The regenerative braking generates power for the battery pack 24. However, losses associated with moving power to and from the battery pack 24 can be introduced.

Pressing the brake pedal 58 slows the vehicle drive wheels 28. A relatively light press on the brake pedal 58 may initiate regenerative braking to slow the vehicle drive wheels 28. Pressing the brake pedal 58 more firmly can slow the vehicle drive wheels 28 with a friction brake. Friction brakes introduce losses due to, among other things, the associated friction.

When the accelerator pedal 56 and the brake pedal 58 are not pressed, some electrified vehicles may coast freely without regenerative braking.

Other electrified vehicles, such as the electrified vehicle having a powertrain 10, can initiate regenerative braking when the accelerator pedal 56 and the brake pedal 58 are not pressed. The regenerative braking, and losses associated therewith, will continue unless the powertrain 10 enters a coast mode where the clutch 54 disengages the power transfer unit 44.

Figure 2:
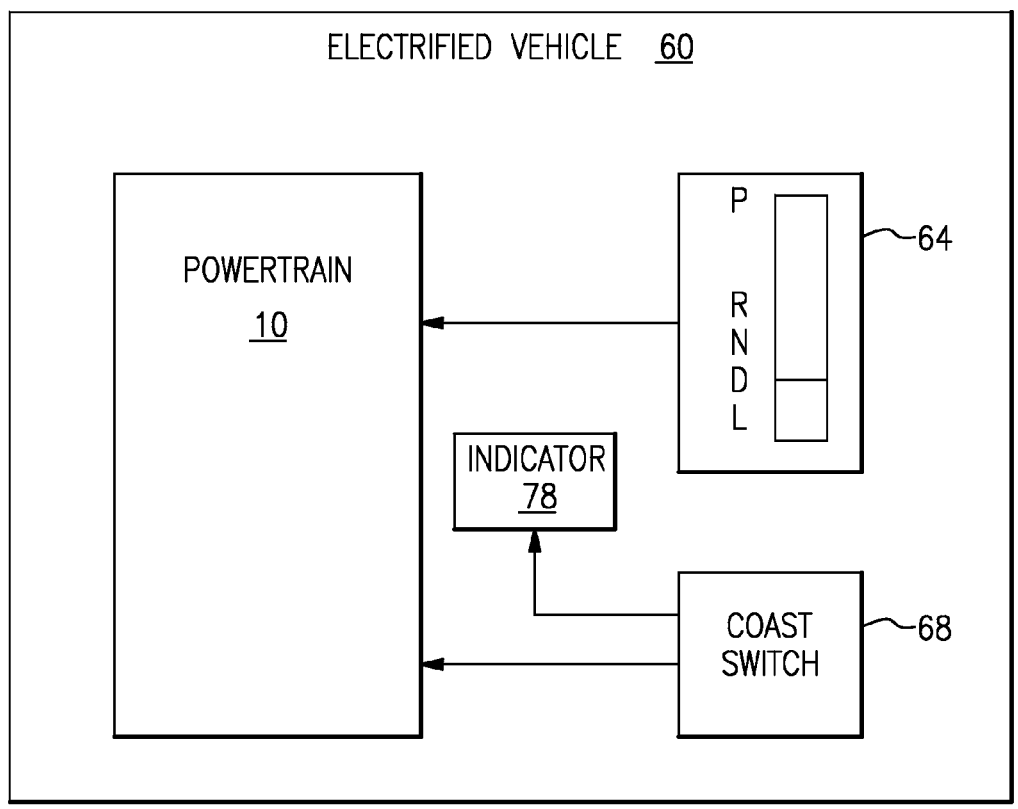
FIG. 2 shows a highly schematic view of an example electrified vehicle having the powertrain of FIG. 1.
Figure 3:
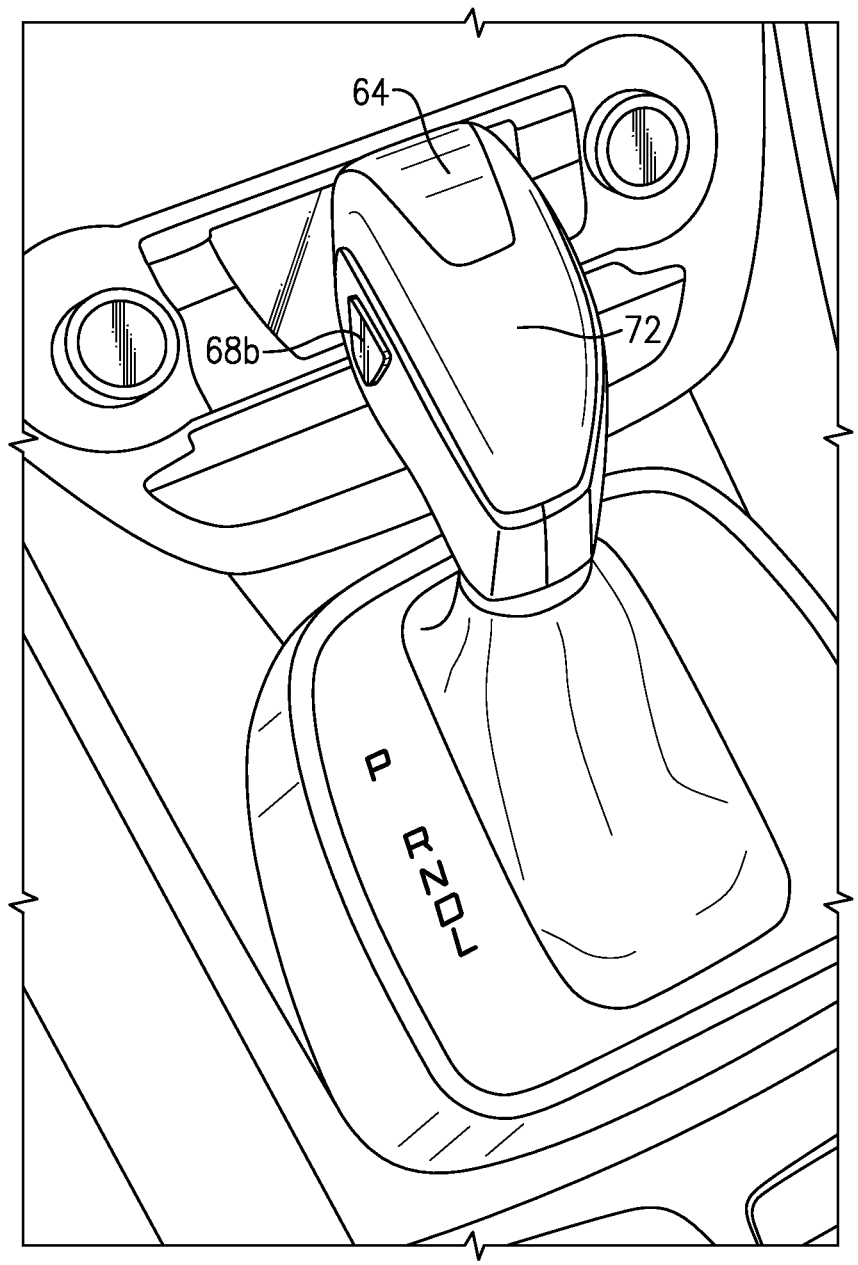
FIG. 3 shows a perspective view of an example gear selector used in the electrified vehicle of FIG. 2.

Referring now to FIGS. 2 and 3 with continuing reference to FIG. 1, an example electrified vehicle 60 includes the powertrain 10. The electrified vehicle 60 includes a gear selector 64 and a coast switch 68. The gear selector 64 can be actuated between a park mode, a reverse mode, a neutral mode, a drive mode, and a lower drive mode.

When the gear selector 64 is in the drive mode as shown, the vehicle drive wheels 28 can be driven through the powertrain 10 if the power transfer unit 44 is in the engaged position.

When the gear selector 64 is positioned in the neutral mode, the vehicle drive wheels 28 are free to move as is known. Positioning the gear selector 64 in the neutral mode when the electrified vehicle 60 is moving permits the electrified vehicle 60 to coast whether the power transfer unit 44 is engaged or disengaged.

In the past, operators of the electrified vehicle 60 may have moved the gear selector 64 from the drive mode to the neutral mode when the electrified vehicle 60 is moving. This movement was to cause the electrified vehicle 60 to coast and to thus avoid losses associated with regenerative braking or friction braking. As can be appreciated, actuating the gear selector 64 from the drive mode to the neutral mode and then back to the drive mode to exit the coasting can be cumbersome.

The coast switch 68 is separate from the gear selector 64. Activating the coast switch 68 places the electrified vehicle 60 in a coast mode by causing the clutch 54 to move the power transfer unit 44 to the disengaged position. The electrified vehicle 60 can coast when in the coast mode. Notably, the gear selector 64 can stay in the drive mode when the coast switch 68 is activated. The coast switch 68 thus operates independently from the gear selector 64 and is thus considered separate from the gear selector 64.

The coast switch 68, in this example, is a button 68b on a gear selector knob 72. The button 68b is moveable from a first position to a second position.

In the first position, the button 68b is released and not activated. The button 68b may be biased toward the first position.

In the second position, the button 68b is depressed. In the second position, the button 68b causes the clutch 54 to move the power transfer unit 44 to the disengaged position thereby causing the powertrain 10 to operate in the coast mode.

Holding the button 68b in the second position maintains operation of the electrified vehicle 60 in the coast mode. Depressing the button 68b overcomes the biasing force urging the button 68b toward the first position.

A driver of the electrified vehicle 60 can cause the powertrain 10 to enter the coast mode when driving by pressing the button 68b as the electrified vehicle 60 is driven. Pressing the button 68b to coast the electrified vehicle 60 ensures that the powertrain 10 will not experience losses associated with regenerative braking.

In addition to activating the clutch 54, depressing the button 68b may cause the electric machines of the powertrain 10 to shut down to further conserve power in the coast mode.

In other examples, the clutch 54 can be removed from the powertrain 10. In such examples pressing the button 68b to activate the coast mode causes the electric machines (the generator 18 and the motor 22a) of the powertrain 10 to electrically shut down. In such examples, pressing the button 68b to activate the coast mode does not cause a movement of a clutch.

Entering the coast mode thus may involve moving the clutch 54, deactivating some or all of the electric machines, or some combination of these.

The driver, when approaching a stop sign, may press the button 68b to cause the electrified vehicle 60 to enter the coast mode and coast rather than permit regenerative braking. The electrified vehicle 60 slows during the coast mode due to, among other things, frictional losses associated with the road. After coasting for a bit, the driver can press the brake pedal 58 to bring the electrified vehicle 60 to a complete stop with friction braking. Notably, the friction braking operates whether the power transfer unit 44 is engaged or disengaged.

The driver then releases the button 68b, and the button 68b returns to the first position. The clutch 54 moves the power transfer unit 44 to the button 68b returning to the first position.

Although the coast switch 68 is provided by the button 68b positioned on the gear selector knob 72, the button 68b is separate from the gear selector 64 as the button 68b can be moved independently from the gear selector 64.

The example gear selector 64 includes a stick shift having the gear selector knob 72. In another example, the gear selector 64 is a rotary shift knob that is rotated to move between the park mode, reverse mode, neutral mode, drive mode, etc. In such examples, the coast switch 68 can be a button positioned on an top or outwardly facing surface of the rotary shift knob.

The coast switch 68 can be positioned on other areas of the electrified vehicle 60 including, but not limited to, the dash, or a steering wheel. The coast switch 68 may have the form of a paddle switch if the coast switch 68 is positioned on the steering wheel.

The coast switch 68 could also be physically inaccessible by an operator of the electrified vehicle 60 during driving. In such examples, the coast switch 68 may be activated by an audible command from the operator of the electrified vehicle 60.

The electrified vehicle 60, may include an indicator 78, such as a light within an instrument cluster, notifying the operator that a coasting mode is engaged. The indicator is operably coupled to the coast switch 68 and may, light up when the coast switch 68 is in the first position. The indicator 78 could also be an audible alert, or some combination of an audible and visual indicator.

Features of the disclosed examples include an electrified vehicle providing an operator with an option to enhance fuel economy by maximizing regenerative braking or by coasting. This dual approach allows the operator to enhance regenerative capture without requiring actuation of the brake pedal in heavy traffic. The same operator is able to capitalize on the benefits of a coast mode without requiring an awkward actuation of the gear selector.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method, comprising:
activating a coast switch to a place an electrified vehicle in a coast mode that prevents any regenerative braking of the electrified vehicle, the activating comprising moving the coast switch from a first position to a second position,
wherein the coast switch is biased to the first position, and a user holds the coast switch in the second position to overcome the bias and maintain the electrified vehicle in the coast mode.

2. The method of claim 1, further comprising maintaining a gear selector in a drive mode during the activating.

3. The method of claim 2, wherein the gear selector can be actuated between at least a drive mode, a neutral mode, and a reverse mode.

4. The method of claim 1, wherein the coast switch is separate from a gear selector of the electrified vehicle.

5. The method of claim 1, wherein the second position is a depressed position and the first position is a released position.

6. The method of claim 1, wherein deactivating the coast switch comprises moving the coast switch from the second position to the first position.

7. The method of claim 1, further comprising activating the coast switch separately from a gear selector of the electrified vehicle without applying a brake.

8. The method of claim 1, further comprising transitioning gears of a powersplit powertrain from an engaged position to a disengaged position in response to activating the coast mode, the powersplit powertrain transmitting torque to a differential of the electrified vehicle when the gears are in the engaged position, the powersplit powertrain prevented from transmitting torque to a differential of the electrified vehicle when the gears are in the disengaged position.

9. The method of claim 1, further comprising shutting down at least one electric machine of the electrified vehicle in response to the activating.

10. An electrified vehicle, comprising:
a gear selector actuatable between at least a drive mode, a neutral mode, and a reverse mode; and
a coast switch separate from the gear selector, the coast switch activated to selectively place an electrified vehicle in a coast mode that prevents any regenerative braking of the electrified vehicle, the coast switch biased to a first position and activated by moving from the first to a second position, wherein a user holds the coast switch in the second position to overcome the bias and maintain the electrified vehicle in the coast mode.

11. The electrified vehicle of claim 10, wherein the coast switch is activated to selectively place the electrified vehicle in the coast mode when the gear selector is in drive mode.

12. The electrified vehicle of claim 10, wherein the coast switch comprises a button disposed on a gear shift knob.

13. The electrified vehicle of claim 10, wherein the coast switch comprises a button disposed on a steering wheel of the electrified vehicle.

14. The electrified vehicle of claim 10, further comprising a clutch that moves a power transfer unit from an engaged position to a disengaged position in response to activation of the coast switch, the power transfer unit having gears that transmit torque to a differential when in the engaged position and do not transmit torque to the differential when in the disengaged position.

15. The electrified vehicle of claim 10, further comprising an electric machine configured to provide regenerative braking of the electrified vehicle when activated and to provide no regenerative braking when deactivated, the electric machine deactivated when the electrified vehicle is in the coast mode.

* * * * *